United States Patent Office 2,747,486
Patented May 29, 1956

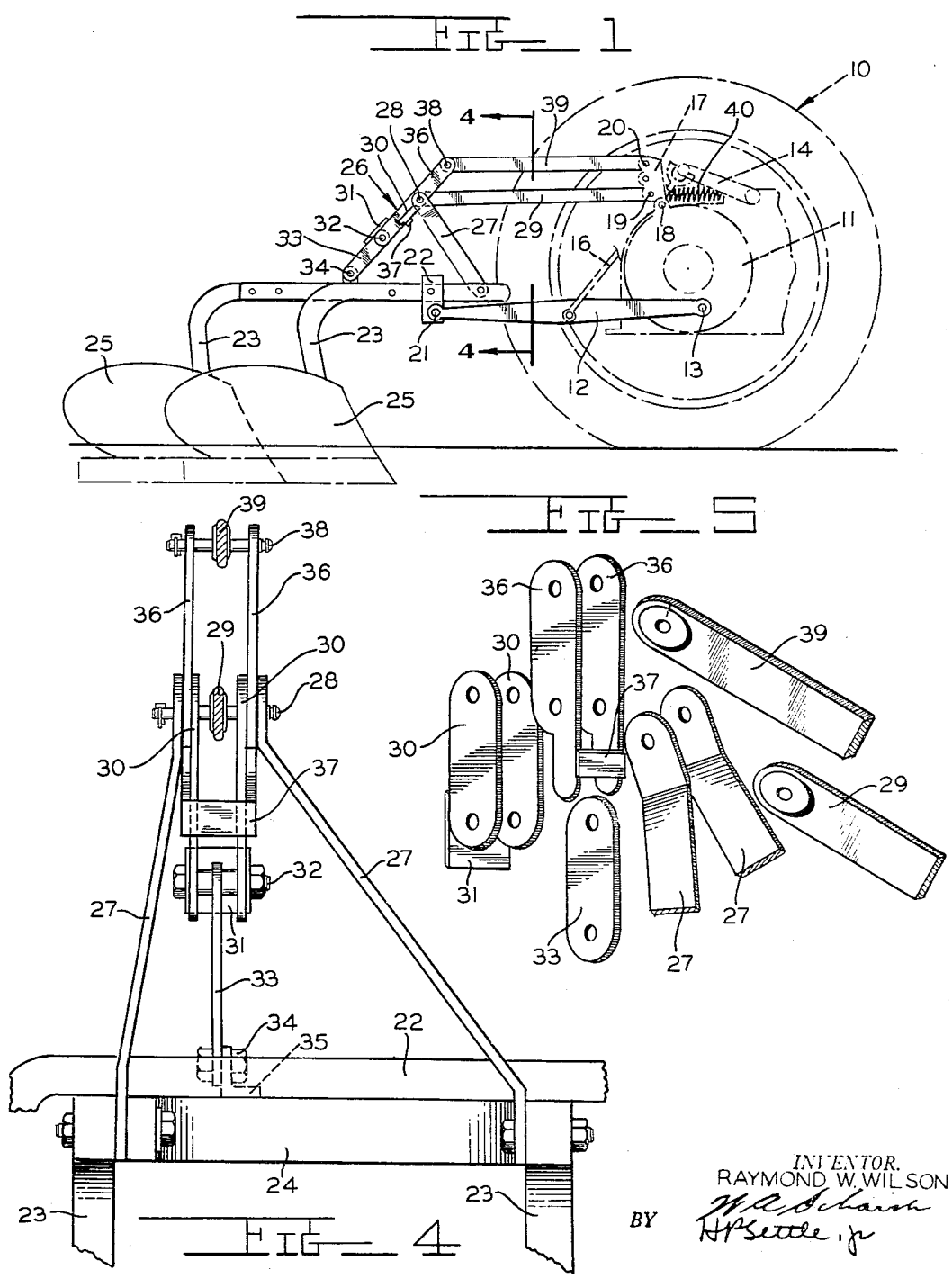

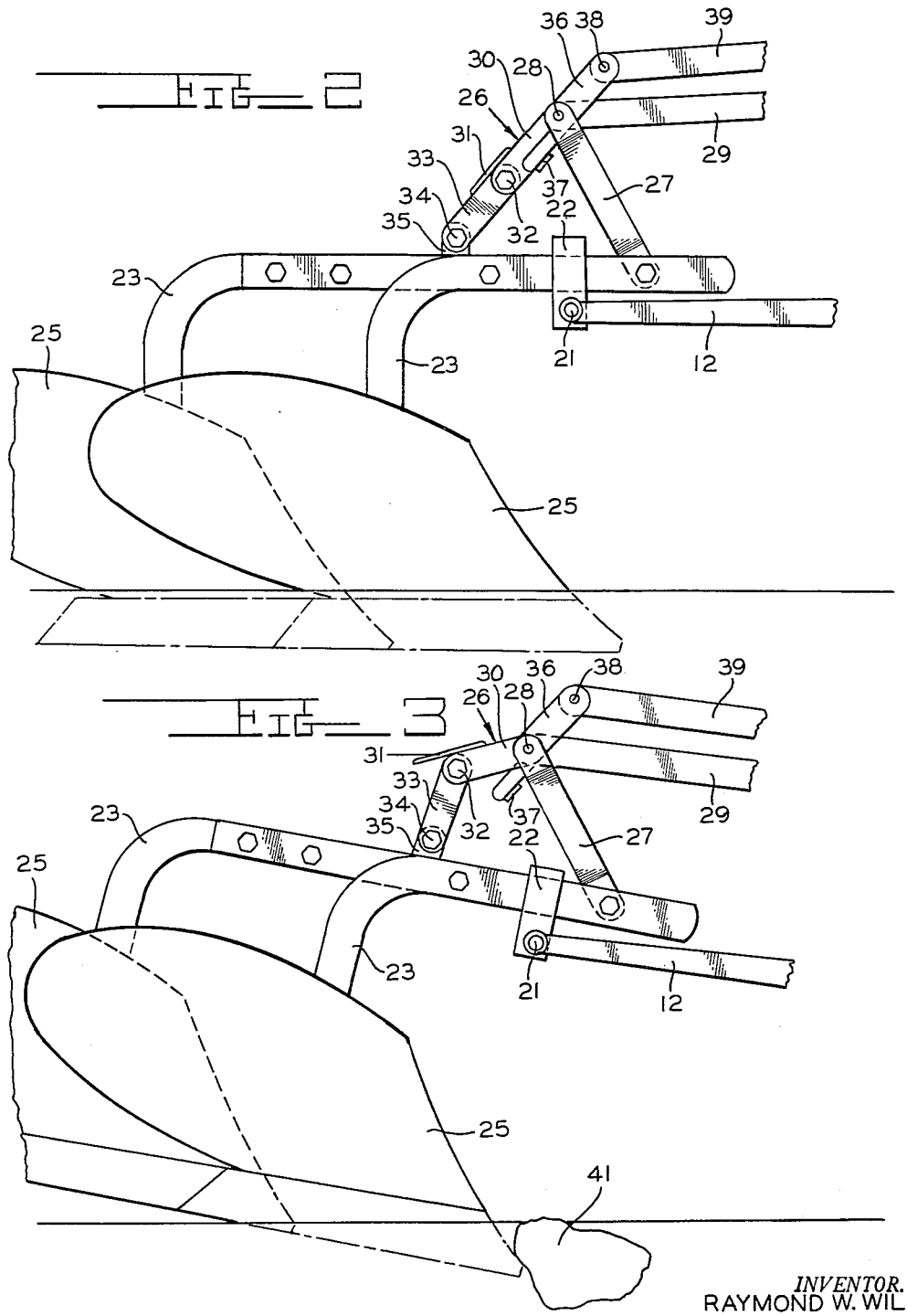

---

2,747,486

IMPLEMENT FRAME

Raymond W. Wilson, Ferndale, Mich., assignor, by mesne assignments, to Ford Motor Company, Dearborn, Mich., a corporation of Delaware Application April 21, 1953, Serial No. 350,055

6 Claims. (Cl. 97—47.8)

The present invention relates to an implement frame and more particularly to an implement frame which is actuated to an adjusted position when the implement is subjected to abnormally severe operating conditions, thereby protecting the implement from damage.

In the use of heavy draft implements, particularly tillage implements such as moldboard plows, disc plows, and the like, there has long been a need for an implement protecting connection to accommodate movement of the implement relative to an obstruction encountered during operation. The present invention provides such an implement protection connection which forms a part of the implement frame and which is actuated by the forces imposed upon the frame when the implement is subjected to abnormal operating conditions causing excessive implement draft.

More particularly, the present invention provides a collapsible implement frame provided with an overcenter joint which is interposed between the tractor or other prime mover and the implement. The device of the present invention is particularly adapted for use with mounted implements of the type carried by trailing draft links mounted upon the tractor. The overcentered joint is desirably provided by the frame of the implement and is adapted to be actuated by differential movement between a pair of upper links joining the tractor and the implement in vertically spaced relation to the draft links. The overcenter joint is subjected to compressive forces generated by the normal draft of the implement. The subjection of the implement to abnormally high draft forces effects differential movement of the upper links to actuate the collapsible joint, so that the implement is free to rotate about its point of connection to the draft links so as to clear the obstruction. Once the obstruction is cleared, the weight of the implement returns the protection connection to its normal overcentered position and the weight of the connection itself overcenters the same in readiness for a subsequent actuation.

It is, therefore, an important object of the present invention to provide an improved implement protection connection.

A further object is the provision of an implement protection connection for mounted implements which is actuated by excessive implement draft forces generated upon the implement striking an obstruction.

It is a further object to provide a collapsible implement frame actuatable in response to abnormally high implement draft to protect the implement against excessive overload forces.

Still another important object is the provision of a collapsible implement frame pivotally connected to a tractor-mounted draft link and having an overcenter joint which is actuatable by excessive implement draft to accommodate movement of the implement about its point of connection to the draft link.

The specific nature of this invention, as well as other objects and advantages thereof, will become apparent to those skilled in the art from the following detailed description, taken in conjunction with the attached sheets of drawings on which, by way of preferred example only, is illustrated one embodiment of this invention.

On the drawings:

Figure 1 is a side elevational view of a collapsible implement frame utilized to connect a tractor (shown in dotted outline) to a tillage implement;

Figure 2 is an enlarged fragmentary elevational view similar to Figure 1;

Figure 3 is an enlarged view similar to Figure 2 in which the implement frame is illustrated in an actuated position;

Figure 4 is an enlarged sectional view taken along the plane 4—4 of Figure 1;

Figure 5 is a greatly enlarged fragmentary perspective view illustrating the operative parts of an implement frame of the present invention in exploded relation.

As shown on the drawings:

In Figure 1, reference numeral 10 refers generally to a tractor having a rear axle housing 11 provided with a pair of laterally spaced trailing draft links 12 universally pivoted to the housing, as at 13.

The draft link 12 is power-liftable through the well known tractor hydraulic system including hydraulically energized rock arms 14 connected to the draft links by lift arms 16. The tractor rear axle housing 11 is surmounted by a control bracket 17 pivoted to the rear axle housing at 18 providing vertically spaced attachment points 19 and 20. The draft links 12 are connected to oppositely extending lateral attachment pins 21 secured to an implement cross-shaft 22 which is rigid with implement beams 23 joined by a laterally extending beam brace 24 (Figure 4). The beams 23 carry at their respective lower ends plow bottoms 25.

Reference numeral 26 refers generally to an implement frame of the present invention comprising a pair of rearwardly and upwardly extending straps 27 joined to the beams 23, respectively, adjacent the forward ends thereof. The straps 27 are laterally upwardly convergent to define an A-frame construction and the upper ends of the straps are apertured to receive therethrough a lateral pivot pin 28. The pivot pin 28 pivotally carries the rear end of a centrally located upper link 29 which projects forwardly toward the tractor for connection to the bracket 17 at the lower connection point 19 above and laterally intermediate the draft links 12.

The pin 28 also carries a pair of depending levers 30 positioned on either side of the rear end of the link 29. The levers 30 are joined at their lower ends by a stop plate 31 and by a laterally extending pivot bolt 32. The pivot bolt 32 journals a depending strap 33 which is pivotally connected, as through bolt 34, to an angle bracket 35 rigidly secured to the lateral beam brace 24 rearwardly of the cross-shaft 22. The transverse pivot pin 28 also carries a pair of generally upstanding straps 36 which are laterally spaced so as to be positioned between the levers 30 and the upper ends of the straps 27 defining the A-frame. The members 36 are joined by a stop plate 37 at their lower ends and at their upper ends support a lateral pivot pin 38 joined to the rear end of a top link 39. The top link 39 projects forwardly from the implement toward the tractor for connection to the bracket 17 at the connection point 20, and the top link 39 is substantially parallel to the upper link 29.

From Figure 1 and Figure 2, it will be noted that the levers 30, the strap 33, and the levers 36 are substantially longitudinally aligned and that the aligned levers extend diagonally rearwardly and downwardly to join the top link 39 and the upper link 29 to the implement beams 23. Actually, the pivot pin 28 and the bolts 32 and 34 do not lie in a single plane, but the bolt 32 is normally displaced slightly below the single plane joining the pin 28 at the bolt 34 so that the levers 30 and the strap 33 define an overcentered toggle connection. The stop plate 31 joining the lower ends of the levers 30 contacts the upper surface of the strap 33 to limit overcenter movement of the pivot bolt 32.

The operation of the implement as shown in Figures 1 and 2 will cause the generation of draft forces upon the plow bottoms 25, and these forces are transmitted through the beams 23 and through the substantially aligned elements 36, 30 and 33 to the upper link 29 and are exerted upon the bracket 17 so as to tend to compress the control spring 40. Of course, any tendency of the members 30, 33 and 36 to collapse toward a further overcentered position is resisted by the stop plate 31 bearing against strap 33.

However, when an excessive draft force is exerted upon the implement, as exemplified by one of the bottoms 25 striking an obstruction 41 (Figure 3), this draft is transmitted to the link 29, causing displacement of the bracket 17 about its pivot center 18 against the resistance of the spring 40. The top link 39 is further from the pivot center 18 at its point of connection to the bracket 17 than is the upper link 29, and the top link 30 will travel further forward upon compression of the spring 40. The upper ends of the levers 36 (connected to the top link 39) will be moved forwardly to a greater extent than will the middle portions thereof (pivoted to the upper link 29). This pivotal movement of the members 36 will cause levers 36 to pivot in a clockwise direction, and the stop plate 37 will contact the levers 30 to force the levers 30 rearwardly (counterclockwise) about the pivot pin 28, thus bringing the pivot bolt 32 toward and through the plane joining the pivot pin 28 and the pivot bolt 34.

The pivot bolt 32 will thus be overcentered rearwardly as illustrated in Figure 3, continued implement draft will cause the overcenter connection to collapse, so as to accommodate rotation of the plow beams 23 about the attachment pins 21. The plow bottoms will thus be pivoted rearwardly and upwardly to pass over the obstruction 41 without causing damage to the bottoms or to the beams. After the obstruction has been passed, the plow may be lifted by actuation of the tractor hydraulic system which will elevate the lower links 12. The weight of the beams and the bottoms will cause the beams to rotate downwardly and rearwardly to straighten the levers 30 and the strap 33, and the weight of these members will then cause the same to overcenter to the position illustrated in Figure 2. Thus, the plow is set against relative rotation and the implement frame is conditioned for subsequent actuation should the implement again be subjected to excessive draft forces.

Thus, it will be understood that the present invention provides a new and novel implement protection connection in which a collapsible implement frame is utilized for actuation in response to excessive draft forces to protect the implement against damage.

I claim:

1. In an implement for use with a tractor having a power liftable draft link, a ground working element, frame means rigid with said element and pivotally attachable to said draft link, a pair of spaced upper links having forward ends respectively attachable to the tractor for pivotal movement about a common pivot center but on lever arms of different length, releasable toggle means joining said frame means to the spaced trailing ends of said upper links, so that implement draft tending to rotate said frame means about its point of attachment to said draft link is transmitted through said toggle means to one of said upper links, means accommodating forward movement of said one upper link relative to the tractor in proportion to the implement draft imposed thereon, and means actuated by movement of said one upper link to release said toggle means to accommodate rotation of said frame means when the draft of said implement exceeds a predetermined maximum.

2. In an implement for use with a tractor having a trailing draft link and a spring biased lever located in vertically spaced relation to said draft link, a ground working element, frame means rigidly carrying said element and pivotally attachable to said draft link, the draft of said element tending to rotate said frame means about the connection of said frame means and said draft link, a pair of vertically spaced upper links connected to said spring biased lever and trailing therebehind toward said frame means, a releasable overcenter toggle device interposed between the trailing ends of said upper links and said frame means to resist rotation of said frame means and to normally impose implement draft on one of said upper links as a compression force directly proportional to implement draft and acting in opposition to the spring bias of said lever, and means responsive to forward movement of said one upper link for releasing said toggle device to accommodate frame means rotation when the implement draft exceeds a predetermined value.

3. In an implement protection connection having a ground-working element and an implement frame rigid with said element and having a tendency to rotate under draft forces generated by said element to elevate said element from its working position, the improvements of a pair of differentially longitudinally displaceable members, a pair of movable overcenter toggle links operatively connecting said frame and said members to subject one of said members to a compression force directly proportional to implement draft as determined by the tendency of said frame to rotate, said members and said toggle links preventing such rotation, and means actuated by differential displacement of said members when implement draft exceeds a predetermined amount to move said toggle links from overcentered position, thereby releasing said frame for rotation.

4. In a mounted implement for use with a tractor having a trailing draft link and a spring biased lever pivoted at one end to the tractor in vertically spaced relation to said draft link, the improvements of a pair of spaced trailing upper links having forward ends respectively connectible to said lever in spaced relation to one another for differential movement upon movement of said lever, a medially pivoted actuating lever joined the trailing ends of said upper links, an implement frame pivoted to the trailing end of said draft link, a ground-engaging element carried by said frame, draft forces generated by said element tending to cause said frame to rotate about the connection of said frame to said draft link, thereby elevating said ground-engaging element, and a collapsible connection normally rigidly joining said frame and said actuating lever so that draft forces tending to rotate said frame are imposed on one of said upper links as a compression force acting against the biasing force of said spring biased lever, differential movement of said upper links when the compression force exceeds a predetermined maximum moving said actuating lever to collapse said collapsible connection to accommodate rotation of said frame and thus to elevate said ground-engaging element.

5. The combination with a tractor having a power lifted hitch link, a rocker member on the tractor and an upper link pivotally mounted at its one end on the rocker member; of an implement, means for mounting the implement on the hitch link, an upstanding arm member, a normally extended collapsible brace member having its ends respectively pivotally secured to said arm member and the implement, means for pivotally connecting the other end of the upper link to said arm member, a trip member pivotally mounted on said arm member, and a link member having its ends respectively pivotally connected to the rocker member and said trip member, said top link moving the rocker member in response to draft overload whereby said link member is moved to rock said trip member into engagement with said collapsible brace.

member to effect collapse thereof thereby permitting tilting of the implement.

6. The combination with a tractor having a power lifted hitch link, a rocker member on the tractor and an upper link pivotally mounted at its one end on the rocker member; of an implement, means for pivotally mounting the implement on the hitch link, an upstanding fixed arm member, normally extended collapsible brace means including a pair of normally longitudinally aligned members having pivotally connected adjacent ends and opposite ends respectively pivotally secured to said arm member and the implement, the pivot point joining the adjacent ends of said members being overcentered beyond the plane joining the opposite ends thereof, means for pivotally connecting the other end of the upper link to said arm member, a trip member pivotally mounted on said arm member and actuatable to contact one of said grace members to move the same from the overcentered position, and a link member having its ends respectively pivotally connected to the rocker member and said trip member, said top link moving the rocker member in response to draft overload whereby said link member is moved to rock said trip member into engagement with said collapsible brace member to effect collapse thereof thereby permitting tilting of the implement about the point of connection of the implement to the hitch link.

References Cited in the file of this patent

UNITED STATES PATENTS 2,573,221     Romig _____ Oct. 30, 1951